US 12,259,288 B2

(12) United States Patent
Ogasawara et al.

(10) Patent No.: US 12,259,288 B2
(45) Date of Patent: Mar. 25, 2025

(54) LIGHT EMITTING APPARATUS

(71) Applicant: NINTENDO CO., LTD., Kyoto (JP)

(72) Inventors: Yoshiyasu Ogasawara, Kyoto (JP); Hironori Furuike, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 431 days.

(21) Appl. No.: 17/554,877

(22) Filed: Dec. 17, 2021

(65) Prior Publication Data

US 2022/0196495 A1    Jun. 23, 2022

(30) Foreign Application Priority Data

Dec. 18, 2020   (JP) ................................ 2020-210147

(51) Int. Cl.
    *G01L 1/24*     (2006.01)
    *G01S 7/481*     (2006.01)
    *G01S 17/04*     (2020.01)

(52) U.S. Cl.
    CPC ............ *G01L 1/248* (2013.01); *G01S 7/4813* (2013.01); *G01S 17/04* (2020.01)

(58) Field of Classification Search
    CPC ....... G01L 1/248; G01S 7/4813; G01S 17/04; G01B 11/16
    See application file for complete search history.

(56) References Cited

U.S. PATENT DOCUMENTS

| | | |
|---|---|---|
| 2002/0080351 A1 | 6/2002 | Sakai |
| 2007/0002407 A1 | 1/2007 | Kageyama et al. |
| 2016/0328090 A1 | 11/2016 | Klinghult |
| 2017/0054441 A1 | 2/2017 | Maigler et al. |
| 2021/0072101 A1 | 3/2021 | Kato et al. |
| 2022/0013578 A1 | 1/2022 | Ikeda et al. |

FOREIGN PATENT DOCUMENTS

| | | | |
|---|---|---|---|
| DE | 102012025641 B3 | | 9/2016 |
| JP | 2002195946 A | | 7/2002 |
| JP | 2006349623 A | | 12/2006 |
| JP | 2010539474 A | | 12/2010 |
| JP | 2013229230 A | * | 11/2013 |
| JP | 2015118398 A | | 6/2015 |
| JP | 2019503118 A | | 1/2019 |

(Continued)

*Primary Examiner* — Uzma Alam
*Assistant Examiner* — Huy Phillip Pham
(74) *Attorney, Agent, or Firm* — Scully, Scott, Murphy & Presser, P.C.

(57) ABSTRACT

A light emitting apparatus has a visible light emitter, an invisible light emitter, invisible light receiver for receiving invisible light emitted from the invisible light emitter, cover member covering these components, and controller for controlling operation of the visible light emitter. The cover member has flexibility so as to deform when receiving external force, and at least partially reflects invisible light and passes and diffuses visible light. The invisible light emitter emits invisible light toward an inside surface of the cover member, and the invisible light receiver receives invisible light and reflected by the cover member. The controller controls an emission mode of visible light emitted from the visible light emitter in accordance with a reception state of invisible light at the invisible light receiver, which changes in accordance with deformation of the cover member.

15 Claims, 11 Drawing Sheets

(56) References Cited

FOREIGN PATENT DOCUMENTS

| JP | 2020166058 A | 10/2020 | |
|---|---|---|---|
| WO | 2009035324 A1 | 3/2009 | |
| WO | WO-2013072712 A1 * | 5/2013 | ............... G01L 1/24 |
| WO | WO-2017174097 A1 * | 10/2017 | ........... H03K 17/968 |
| WO | 2018057146 A1 | 3/2018 | |
| WO | 2020/017177 A1 | 1/2020 | |

* cited by examiner

LIGHT EMITTING APPARATUS

CROSS-REFERENCE TO RELATED APPLICATION

The present application claims priority to Japanese Patent Application No. 2020-210147 filed on Dec. 18, 2020, which is incorporated herein by reference in its entirety including the specifications, drawings and abstract.

FIELD

The present disclosure relates to a light emitting apparatus.

BACKGROUND

Known in the past has been a contact sensor for sensing a contact force from an object in accordance with a result of light reception. For example, WO 2020/017177 A discloses a contact sensor which comprises a light source for emitting infrared light, a light receiver for receiving the infrared light to generate a signal showing the result of light reception, and a cover member configured by an elastic member deforming in accordance with external force and covering the light source and light receiver, and detects a contact force from an outside part to the cover member in accordance with the result of light reception by the light receiver of the infrared light emitted from the light source and reflected by a mirror provided at the inside surface of the cover member.

In this regard, the contact sensor described in WO 2020/017177 A can sense the contact force of an object in accordance with the result of light reception, but does not operate in accordance with deformation of the cover member. Therefore, an object of the present disclosure is to provide a light emitting apparatus able to change a mode of diffused light appearing on the outside surface of the cover member in accordance with deformation of the cover member by external force.

SUMMARY

The gist of the present disclosure is as follows:
(1) A light emitting apparatus, comprising:
a visible light emitter for emitting visible light;
an invisible light emitter for emitting invisible light;
an invisible light receiver for receiving invisible light emitted from the invisible light emitter;
a cover member arranged spaced apart from the visible light emitter, the invisible light emitter, and the invisible light receiver and covering the visible light emitter, the invisible light emitter, and the invisible light receiver; and
a controller for controlling operation of the visible light emitter, wherein
the cover member has flexibility so as to deform when receiving external force, and at least partially reflects invisible light emitted from the invisible light emitter and passes and diffuses visible light emitted from the visible light emitter,
the invisible light emitter emits invisible light toward an inside surface of the cover member, and the invisible light receiver receives invisible light emitted from the invisible light emitter and reflected by the cover member,
the controller controls a mode of emission of visible light emitted from the visible light emitter in accordance with a state of reception of invisible light at the invisible light receiver, which changes in accordance with deformation of the cover member.
(2) The light emitting apparatus according to the above (1), wherein the controller changes at least one of a strength, color, and emission pattern of visible light emitted from the visible light emitter, in accordance with the state of reception of invisible light at the invisible light receiver.
(3) The light emitting apparatus according to the above (1) or (2), wherein
one or more invisible light receivers are provided at the one light emitting apparatus, and
one of the invisible light receivers is positioned so as to be superposed over a center part of the cover member when viewed in an axial direction passing through a center of symmetry of the cover member.
(4) The light emitting apparatus according to any one of the above (1) to (3), wherein
one or more visible light emitters are provided at the one light emitting apparatus, and
one of the visible light emitters is positioned so as to be superposed over a center part of the cover member when viewed in an axial direction passing through a center of symmetry of the cover member.
(5) The light emitting apparatus according to the above (3), wherein
one or more visible light emitters are provided at the one light emitting apparatus,
one of the visible light emitters is positioned so as to be superposed over a center part of the cover member when viewed in the axial direction, and
the invisible light receiver positioned so as to be superposed over the center part when viewed in the axial direction is arranged more at a front surface side of the light emitting apparatus than the visible light emitter positioned so as to be superposed over the center part when viewed in the axial direction.
(6) The light emitting apparatus according to any one of the above (1) to (5), wherein
a plurality of the visible light emitters are provided at the one light emitting apparatus, and
the visible light emitters are arranged at equal intervals with each other when viewed in an axial direction passing through a center of symmetry of the cover member.
(7) The light emitting apparatus according to any one of the above (1) to (6), wherein
a plurality of the visible light emitters are provided at the one light emitting apparatus, and
the visible light emitters are arranged on the same flat surface and the cover member has a part extending substantially parallel to the flat surface.
(8) The light emitting apparatus according to any one of the above (1) to (7), further comprising:
a circuit board extending perpendicular to an axial direction passing through a center of symmetry of the cover member, wherein
the visible light emitter, the invisible light emitter, and the invisible light receiver are arranged on the same surface of the circuit board.
(9) The light emitting apparatus according to any one of the above (1) to (8), further comprising:
a circuit board on which the visible light emitter, the invisible light emitter, and the invisible light receiver are mounted, and a reinforcing member extending in parallel with and between the circuit board and the cover member other than at the surroundings of each visible light emitter, invisible light emitter, and invisible light receiver.

(10) The light emitting apparatus according to the above (9), wherein the reinforcing member has circular openings centered about each visible light emitter, invisible light emitter, and invisible light receiver when viewed in an axial direction passing through a center of symmetry of the cover member.

(11) The light emitting apparatus according to any one of the above (1) to (10), further comprising:

a sound generating device for generating a sound, wherein the controller controls operation of the sound generating device in accordance with a state of reception of invisible light at the invisible light receiver.

(12) The light emitting apparatus according to any one of the above (1) to (11), wherein at least part of the cover member is made of semitransparent silicone.

(13) The light emitting apparatus according to any one of the above (1) to (12), wherein the controller controls operation of each visible light emitter based on a difference between a state of reception by the invisible light receiver when the invisible light emitter does not emit invisible light and a state of reception by the invisible light receiver when the invisible light emitter emits invisible light.

(14) The light emitting apparatus according to any one of the above (1) to (13), wherein the controller controls a mode of emission of visible light from the visible light emitter in accordance with a reception strength of invisible light at each invisible light receiver.

(15) The light emitting apparatus according to any one of the above (1) to (14), wherein the cover member is arranged so as to form an upper surface of the light emitting apparatus.

BRIEF DESCRIPTION OF DRAWINGS

Embodiments of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF EMBODIMENTS

Figure 1:
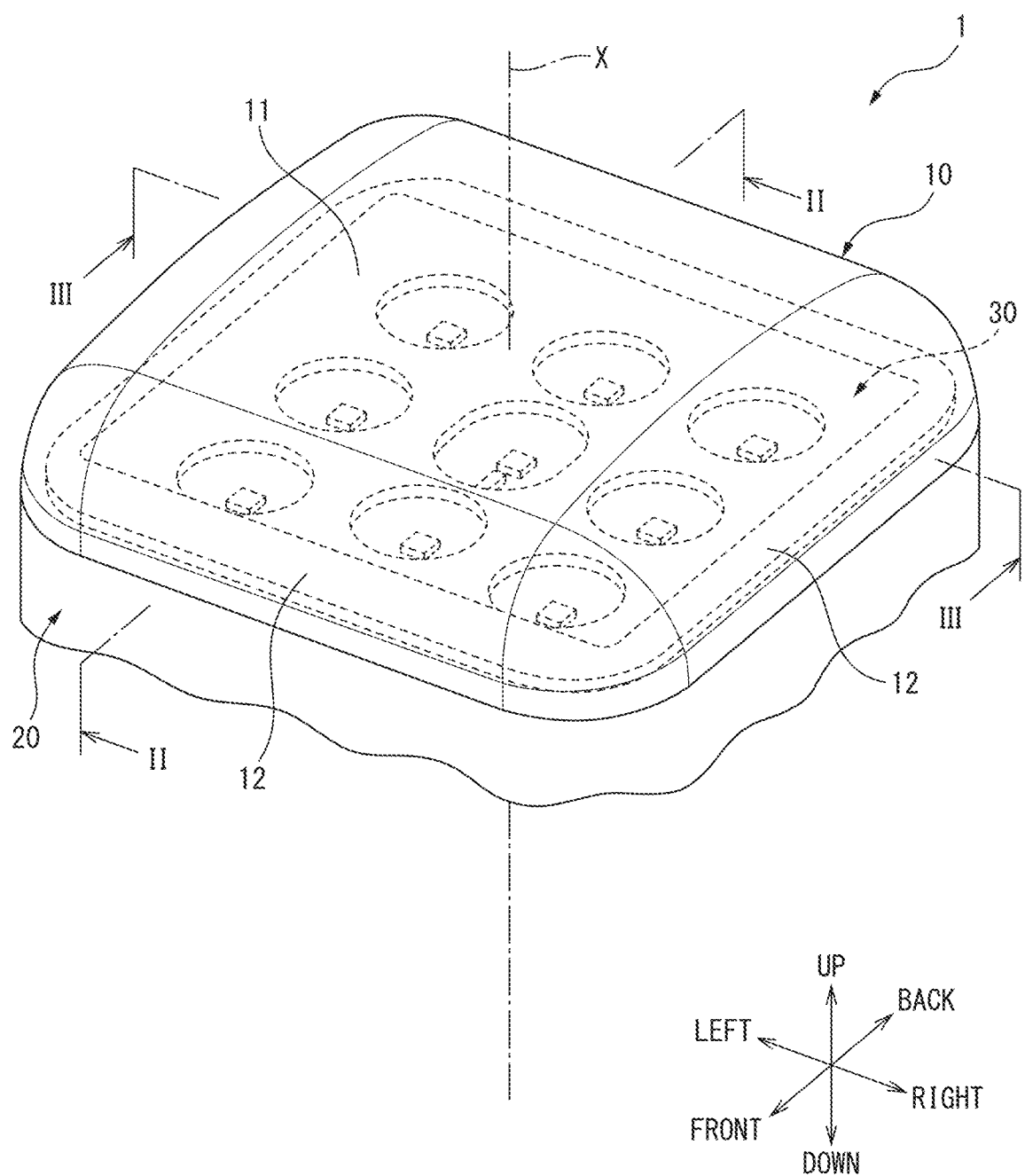
FIG. 1 is a partial perspective view schematically showing a light emitting apparatus in the surroundings of a cover member.

Below, referring to the drawings, embodiments will be explained in detail. Note that, in the following explanation, similar components are assigned the same reference notations.

Summary of Light Emitting Apparatus

Referring to FIGS. 1 to 7, the configuration of a light emitting apparatus 1 changing a mode of diffused light appearing on an outside surface of a cover member in accordance with deformation of the cover member by external force will be explained. First, referring to FIG. 1, the light emitting apparatus 1 will be explained in brief.

FIG. 1 is a partial perspective view schematically showing the light emitting apparatus 1 at the surroundings of a cover member 10. In FIG. 1, components positioned inside of the cover member 10 are shown by broken lines. As shown in FIG. 1, the light emitting apparatus 1 is provided with a housing 20 formed in a substantially cuboid shape and a cover member 10 arranged so as to cover the housing 20.

In the present embodiment, the cover member 10 of the light emitting apparatus 1 is arranged so as to cover the upper area of the housing 20. Therefore, the cover member 10 forms the top surface of the light emitting apparatus 1. Further, in the present embodiment, at one side surface of the housing 20 of the light emitting apparatus 1, a display device of the light emitting apparatus 1, such as a liquid crystal panel, (for example, a liquid crystal display, dot matrix LED, etc., not shown) is provided. Therefore, in this Description, the surface on which the cover member 10 of the light emitting apparatus 1 is provided will be referred to as the "top surface", and the surface on which the display device is provided will be referred to as the "front surface". Further, in the following explanation, as shown in FIG. 1, the front surface side of the light emitting apparatus 1 will be referred to as the "front" and the opposite side to that will be referred to as the "back", while the right side and the left side when viewing the light emitting apparatus 1 from the front surface will be referred to as the "right" and "left", respectively. Note that, at the front surface of the light emitting apparatus 1, operating switches (not shown) may be provided instead of the display device or in addition to the display device.

The light emitting apparatus 1 is configured so that if the cover 10 deforms due to the user pressing the cover member 10 or other external force, the mode of diffused light appearing at the outside surface of the cover member 10 (the way the light of the cover member 10 is visually perceived) and the sound which the light emitting apparatus 1 emits change according to that deformation. More specifically, the light emitting apparatus 1 detects the state of deformation of the cover member 10 by an infrared sensor if the cover member 10 deforms due to external force, and changes the operation of a visible light emitting device for emitting visible light to the cover member 10 so that the mode of diffused light appearing at the outside surface of the cover member 10 changes in accordance with the state of deformation of the cover member 10. Below, the various components and operation of the light emitting apparatus 1 will be explained concretely.

Overall Configuration of Light Emitting Apparatus

Figure 2:
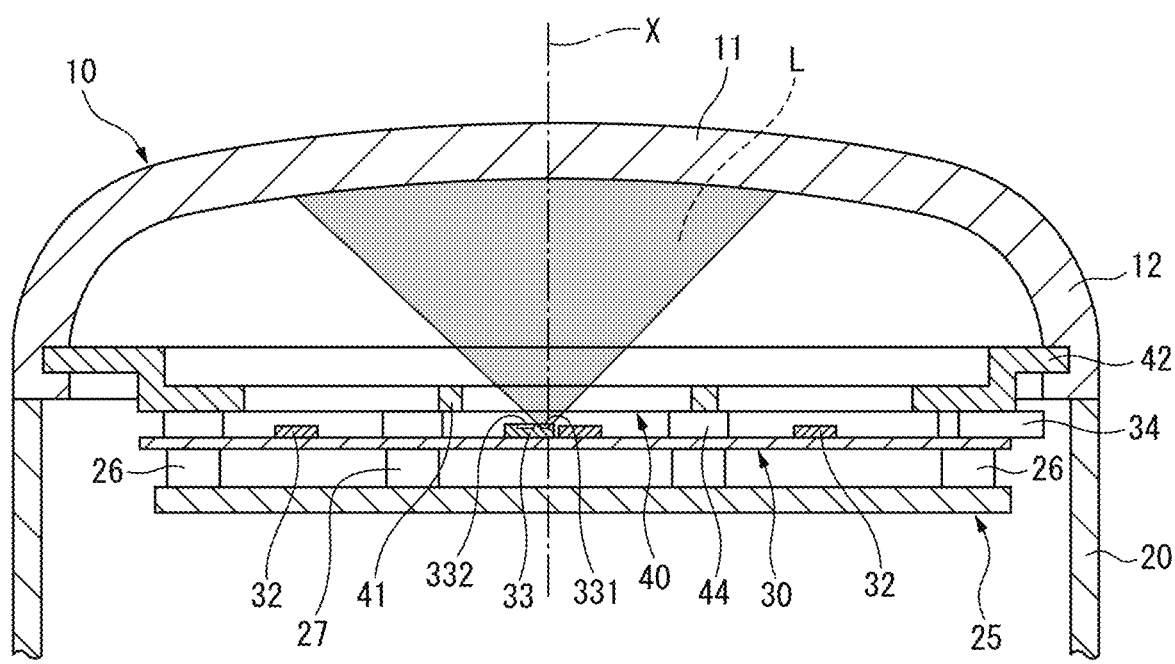
FIG. 2 is a partial cross-sectional view of a light emitting apparatus at the surroundings of a cover member, seen in a direction of an arrow II-II of FIG. 1.
Figure 2:
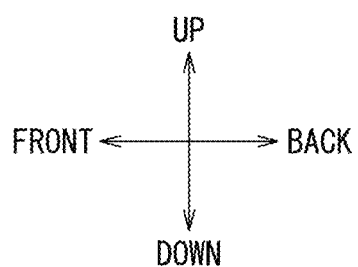
Figure 3:
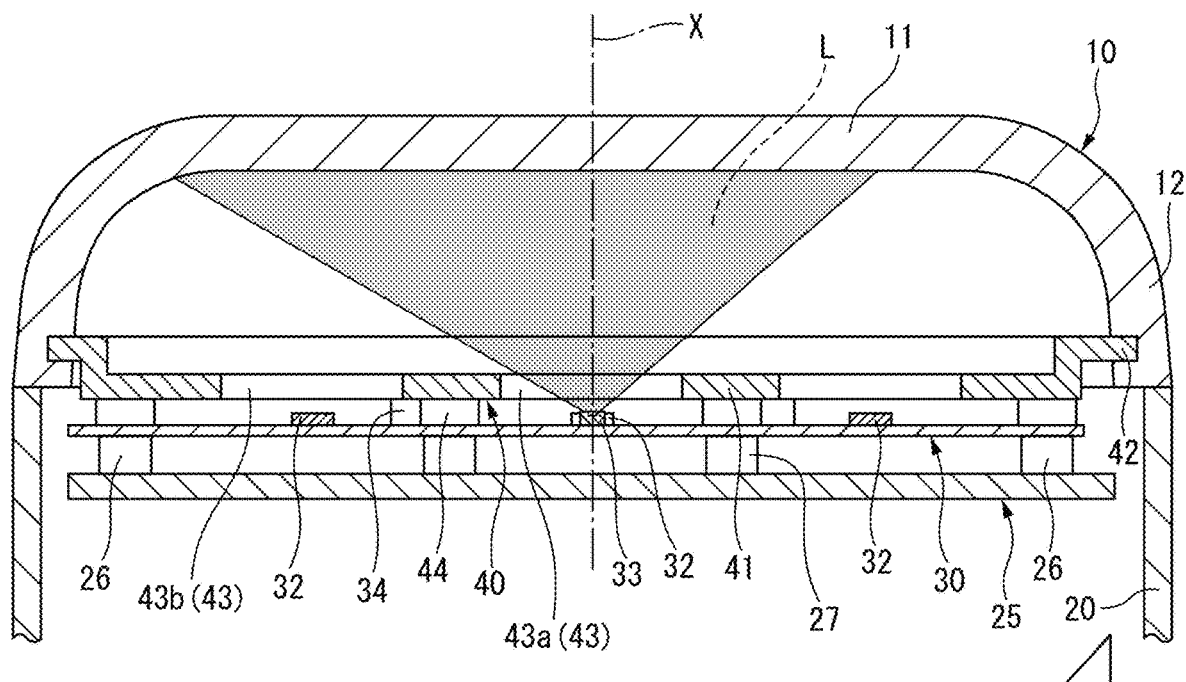
FIG. 3 is a partial cross-sectional view of a light emitting apparatus at the surroundings of a cover member, seen in a direction of an arrow of FIG. 1.
Figure 3:
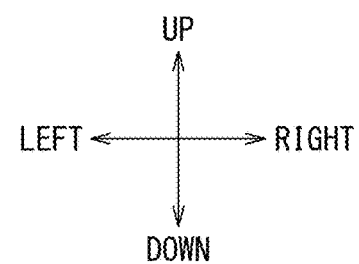
Figure 4:
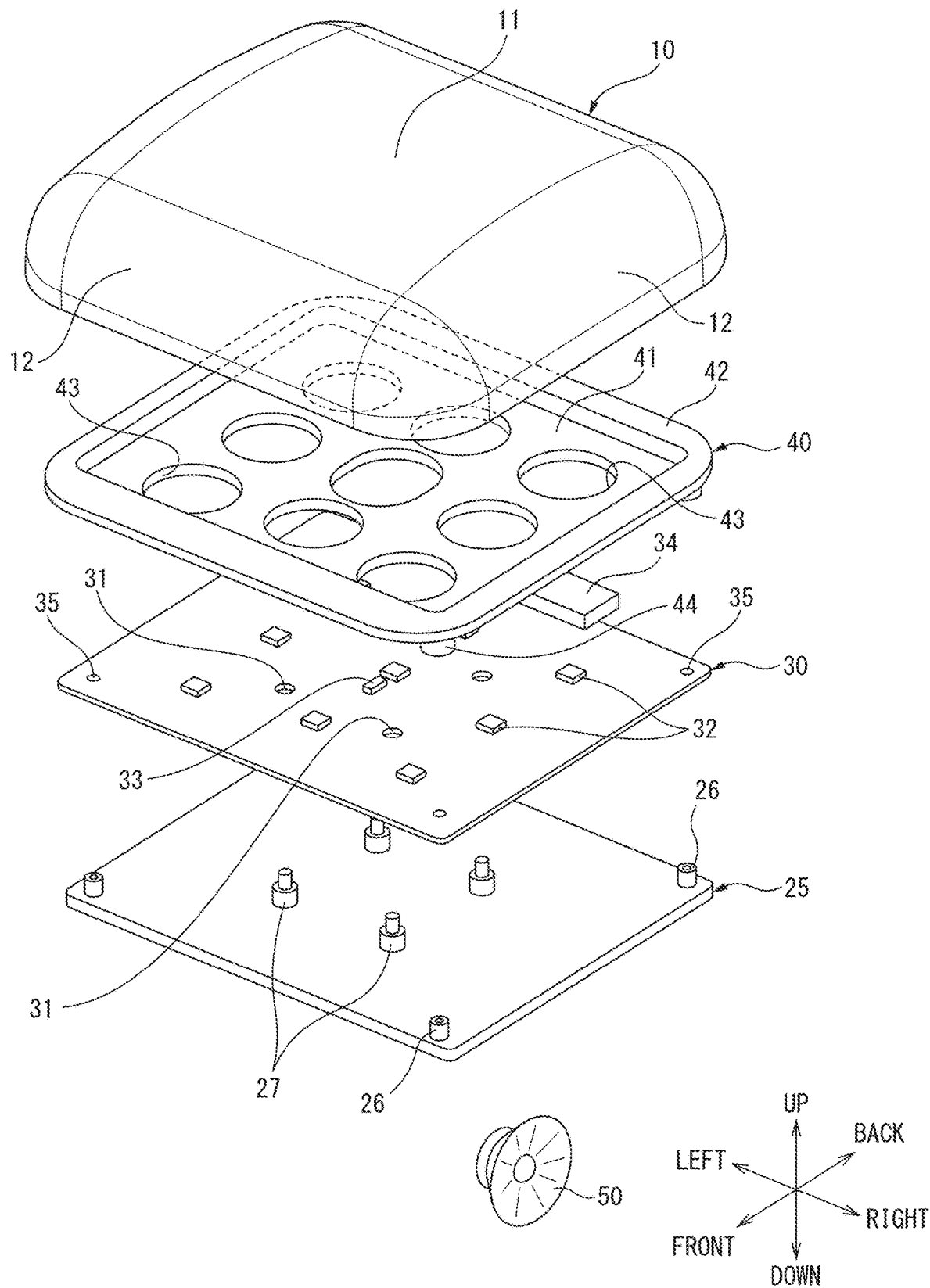
FIG. 4 is a disassembled perspective view of components of a light emitting apparatus at the surroundings of a cover member.

Next, referring to FIGS. 1 to 4, the overall configuration of the light emitting apparatus 1 will be explained. FIG. 2 is a partial cross-sectional view of the light emitting apparatus 1 at the surroundings of the cover member 10, seen in a direction of an arrow II-II of FIG. 1, and FIG. 3 is a partial cross-sectional view of the light emitting apparatus 1 at the surroundings of the cover member 10, seen in a direction of an arrow of FIG. 1. Further, FIG. 4 is a disassembled perspective view of components of the light emitting apparatus 1 at the surroundings of the cover member 10.

The cover member 10 of the light emitting apparatus 1 is a member deforming upon receiving external force and formed so that transmitted and diffused light appears at the outside surface of the cover member 10 if visible light is emitted from inside of the cover member 10. As shown in FIGS. 1 to 4, the cover member 10 is formed in a dome shape provided with a top part 11 of a flat substantially square shape and side parts 12 extending from the outer circumference of the top part 11 downward toward the outside. In the present embodiment, the cover member 10 is arranged to cover the top side of the housing 20.

The housing 20 of the light emitting apparatus 1 is a member holding some of the parts forming the light emitting apparatus 1 inside of it. In the present embodiment, as shown in FIGS. 2 and 3, the housing 20 is formed into a cuboid shape with an open top side. Inside of the housing 20, a housing fastened member 25 fastened to the housing 20, a printed circuit board 30 supported by the housing fastened member 25, a reinforcing member 40 placed on the printed circuit board 30, and a speaker 50 are provided. Therefore, the cover member 10 is arranged spaced apart from the housing fastened member 25, the printed circuit board 30, the reinforcing member 40, and the speaker 50 provided at the inside of the housing 20 so as to cover the same.

The housing fastened member 25 is a member fastened to the housing 20 and supporting the printed circuit board 30. The housing fastened member 25 is formed into a rectangular flat plate shape such as shown in FIG. 4, and is arranged in the vicinity of the top side of the housing 20 so as to extend in parallel with the bottom plate of the housing 20. The housing fastened member 25 is fastened by screws or any other fastening means (not shown) so as not to move with respect to the housing 20. Note that, in the present embodiment, the housing fastened member 25 is configured as a separate member from the housing 20, but may also be formed integrally with the housing 20.

Further, in the present embodiment, the housing fastened member 25 has a plurality of columnar parts 26 and 27 for supporting the printed circuit board 30 and fastening the reinforcing member 40. As will be understood from FIGS. 2 to 4, the columnar parts 26 and 27 extend upward on the top surface of the housing fastened member 25. The outside columnar parts 26 are provided one each near the four corners of the housing fastened member 25. Further, the center columnar parts 27 are provided one each near the intermediate portions between these outside columnar parts 26 at the four corners and the center. The outside columnar parts 26 have screw holes for holding bolts.

The printed circuit board 30 is a member holding the electronic components used in the light emitting apparatus 1 and electrically connecting these electronic components. The printed circuit board 30, as shown in FIG. 4, is formed into a rectangular flat plate shape, and is supported by the housing fastened member 25. In particular, in the present embodiment, the printed circuit board 30 is supported by the center columnar parts 27 provided at the housing fastened member 25, in the state where the front end parts of the center columnar parts 27 pass through center openings 31 provided at the printed circuit board 30 (see FIG. 4). Further, the printed circuit board 30 is supported by the outside columnar parts 26 provided at the housing fastened member 25, in the state placed on the top surfaces of the outside columnar parts 26.

On the surface of the printed circuit board 30 on the cover member 10 side, as electronic components, visible light emitting devices 32 emitting visible light toward the inside surface of the cover member 10, an infrared sensor 33 utilizing infrared light to detect a state of deformation of the cover member 10, and a control circuit 34 controlling the visible light emitting devices 32 and the infrared sensor 33 are provided. Therefore, the light emitting apparatus 1 is provided with the visible light emitting devices 32, infrared sensor 33, and control circuit 34.

The reinforcing member 40 is a member keeping the cover member 10 from reaching the printed circuit board 30 whereby the printed circuit board 30 being damaged, when the cover member 10 is pressed by external force. The reinforcing member 40 is arranged between the printed circuit board 30 and the cover member 10 so as to cover the top surface of the printed circuit board 30. In particular, in the present embodiment, the cover member 10 is attached to the reinforcing member 40. Therefore, in the present embodiment, the cover member 10 is fastened to the housing 20 through the reinforcing member 40 and the housing fastened member 25. Further, in the present embodiment, the reinforcing member 40 is fastened to the housing fastened member 25 by bolts passed through the reinforcing member 40 and outside openings 35 of the printed circuit board 30 and screwed into the screw holes of the outside columnar parts 26.

The speaker 50 is used so as to generate sound in accordance with deformation of the cover member 10. The speaker 50 is attached to the housing 20 inside the housing 20 below the housing fastened member 25. Note that, the speaker 50 may also be attached not to the housing 20, but the housing fastened member 25 or other components inside the housing 20.

The above-mentioned housing 20, housing fastened member 25, and printed circuit board 30 directly or indirectly support the visible light emitting devices 32 and the infrared sensor 33 (that is, the later explained infrared light emitting device 331 and infrared light receiving device 332). Therefore, the housing 20, the housing fastened member 25, and the printed circuit board 30 configure a support member supporting the visible light emitting devices 32, infrared light emitting device 331, and infrared light receiving device 332. In addition, the cover member 10 is arranged so as to cover the top side of the housing 20, in particular so as to cover the top surfaces of the printed circuit board 30 and reinforcing member 40. The printed circuit board 30 is provided with the visible light emitting devices 32, the infrared sensor 33, and the control circuit 34, therefore the cover member 10 is arranged spaced apart from the visible light emitting devices 32, infrared sensor 33, and control circuit 34 and covering the same.

Note that, in the present embodiment, the housing 20 is formed into a cuboid shape. However, the housing 20 may also be formed into a circular columnar shape, polygonal columnar shape, or other shape. Further, the housing 20 opens upward, but may also open other than upward (for example, sideways). Further, the housing 20 may be formed with the open top surface slanted with respect to the vertical line and opening upward at a slant. In each case, the cover member 10 is arranged so as to cover the open surface of the housing 20.

Further, in the present embodiment, the cover member 10 is fastened to the housing 20 through the reinforcing member 40. However, the cover member 10 may also be directly attached to the housing 20 without going through the reinforcing member 40 and may be attached to the housing fastened member 25.

Cover Member

Figure 5:
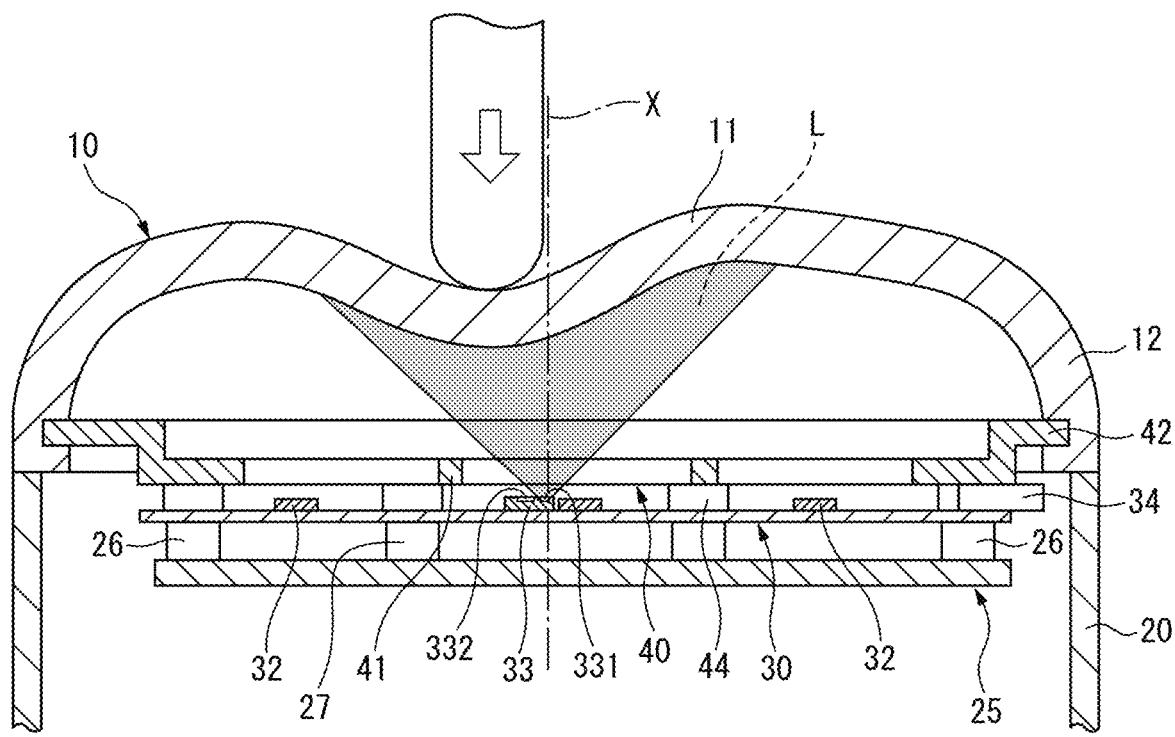
FIG. 5 is a partial cross-sectional view, similar to FIG. 2, of a light emitting apparatus when a cover member receives external force.
Figure 5:
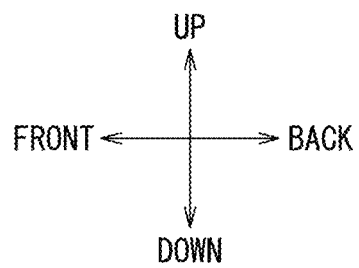

Next, the cover member 10 will be explained in detail. In the present embodiment, the cover member 10 is formed in its entirety by semitransparent silicone of a uniform thickness. Therefore, the cover member 10 has flexibility by which it maintains its original shape such as shown in FIGS. 1 to 4 when not receiving external force, deforms in accordance with external force such as shown in FIG. 5 when receiving that external force, and returns to its original shape when no longer receiving external force. In particular, in the present embodiment, the cover member 10 has flexibility by which it deforms if pressed by a hand of a user.

Further, the cover member 10 is semitransparent, therefore transmits and diffuses visible light. Therefore, if visible light is emitted from inside of the cover member 10 toward the inside surface of the cover member 10, the transmitted and diffused light appears at the outside surface of the cover member 10 and accordingly, from the outside of the cover member 10, it appears as if the cover member 10 were shining. Further, the cover member 10 partially transmits infrared light and partially diffuses and reflects it. Therefore, if infrared light is emitted from the inside of the cover member 10 toward the inside surface of the cover member 10, part of the infrared light striking the cover member 10 is reflected toward the inside of the cover member 10.

Note that, the cover member 10 may also be formed by a material other than semitransparent silicone. However, even in that case, the cover member 10 has to have flexibility by which it deforms upon receiving external force and in particular have flexibility by which it deforms upon receiving a pressing force by a person's hand. In addition, the cover member 10 has to be configured so as to transmit and diffuse visible light. Therefore, the cover member 10 is formed by a semitransparent material or, when the cover member 10 is formed by a transparent material, the inside surface or outside surface of the cover member 10 is formed with fine relief. Furthermore, the cover member 10 has to be formed so as to at least partially reflect infrared light, in particular diffuse and reflect it.

Further, in the present embodiment, the cover member 10 is formed by silicone which is overall semitransparent and partially diffuses and reflects infrared light. However, the cover member 10 may only partially be formed by semitransparent silicone (that is, a material having flexibility, transmitting and diffusing visible light, and reflecting infrared light), and be formed at other parts by another material. In this case, the other material may have a flexibility, visible light transmittability, and/or infrared light reflectivity different from silicone, and accordingly may also be transparent. Therefore, the other material may, for example, be a material not transmitting visible light. Specifically, for example, part of the cover member 10 (for example the center part) may be formed by silicone, which is semitransparent and partially diffuses and reflects infrared light, and the outer circumference part of the cover member 10 may be formed by another plastic. Alternatively, the cover member 10 may partially have fine relief at its inside surface or outside surface and not have relief at the remaining parts.

Figure 9:
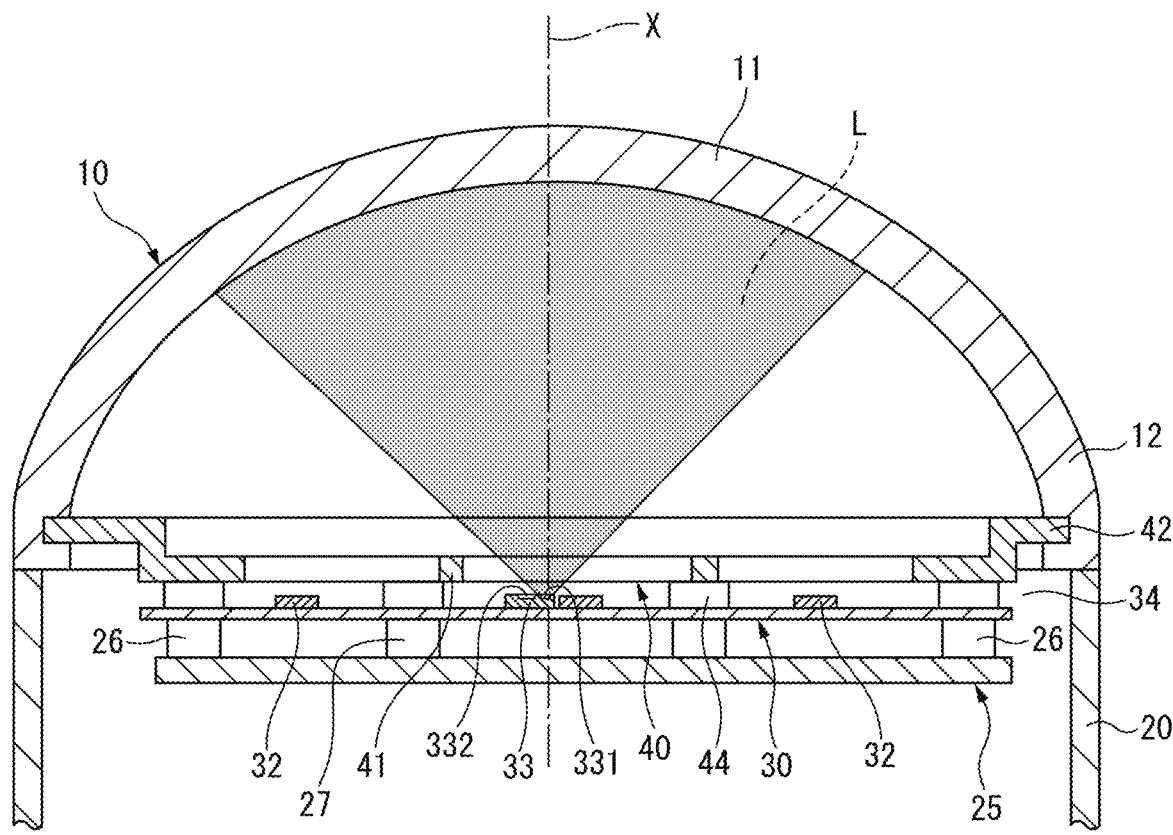
FIG. 9 is a partial cross-sectional view, similar to FIG. 2, of a light emitting apparatus according to one modification.
Figure 9:
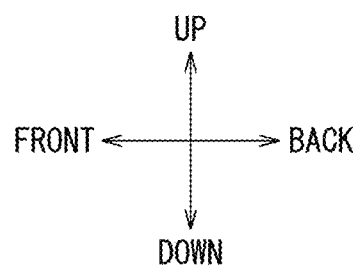

Furthermore, in the present embodiment, the cover member 10 has a shape provided with a top part 11 of a flat substantially square shape and side parts 12 extending from the outer circumference of the top part downward to the outside. However, the cover member 10 may also have a shape different from this. Therefore, for example, as shown in FIG. 9, the cover member 10 may be formed into a semispherical shape or may be formed into a disk shape. When the cover member 10 is formed into a disk shape, the axis running through the center of the disk and extending perpendicular to the disk (that is, the line forming the center of rotational symmetry of the 3D shape) forms the axis passing through the center of symmetry of the cover member 10 (details of this axis explained later).

Printed Circuit Board

In the present embodiment, the printed circuit board 30 is arranged substantially parallel to the top part 11 of the cover member 10, that is, so as to extend perpendicular with respect to the axial direction of the cover member 10 extending from a center of symmetry of the cover member 10 (broken line X-direction of FIGS. 1 to 3). Further, in the present embodiment, it is arranged so that when viewed from above (that is, in the present embodiment, when viewed in the axial direction passing through the center of symmetry of the cover member 10), the center of the printed circuit board 30 is positioned at the center part of the cover member 10.

As explained above, at the top surface of the printed circuit board 30, the visible light emitting devices 32, infrared sensor 33, and control circuit 34 are attached. Therefore, in the present embodiment, the visible light emitting devices 32 and the infrared sensor 33 are arranged on the same surface of the printed circuit board 30. Therefore, in the present embodiment, the visible light emitting devices 32 and the infrared sensor 33 are arranged at the same height in the axial direction passing through the center of symmetry of the cover member 10. By the visible light emitting devices 32 and the infrared sensor 33 being arranged on the one printed circuit board 30 in this way, design and manufacture of the printed circuit board 30 are easy.

Note that, in the present embodiment, the light emitting apparatus 1 has only a single printed circuit board 30. However, the light emitting apparatus 1 may also have a plurality of printed circuit boards, and the visible light emitting devices 32, infrared sensor 33, and control circuit 34 may be provided dispersed among these plurality of circuit boards. Further, in this case, the printed circuit boards may be positioned on different planes. Therefore, for example, the different printed circuit boards may be arranged vertically separated, the infrared sensor 33 may be arranged on a printed circuit board positioned relatively close to the cover member 10, and the visible light emitting devices 32 may be arranged on a circuit board positioned relatively far from the cover member 10. Due to this, the visible light emitting devices 32 are suitably separated from the cover member 10, therefore it is possible to uniformly emit visible light at the cover member 10. Further, the infrared sensor 33 is arranged close to the cover member 10, therefore it is possible to reduce noise accompanying detection of the state of deformation of the cover member 10 by the infrared sensor 33 and improve the detection precision.

Visible Light Emitting Devices

The visible light emitting devices 32 are examples of visible light emitters for emitting visible light, and emit several colors of visible light. As the visible light emitting devices 32, for example, color LEDs or monochrome LEDs, etc., are used. The visible light emitting devices 32 emit visible light toward the inside surface of the cover member 10 by a broad directivity angle. In particular, in the present embodiment, a plurality of visible light emitting devices 32 emit visible light in directions so that the inside surface of the cover member 10 as a whole is evenly irradiated with visible light emitted from the visible light emitting devices 32.

Figure 6:
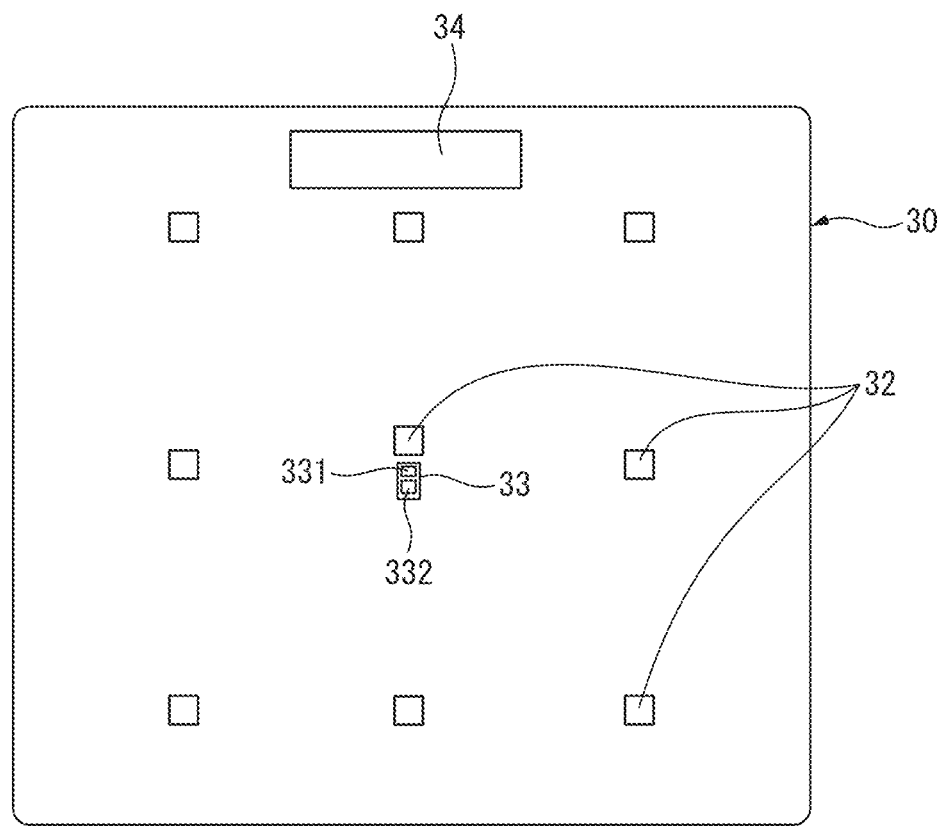
FIG. 6 is a plan view of a printed circuit board.
Figure 6:
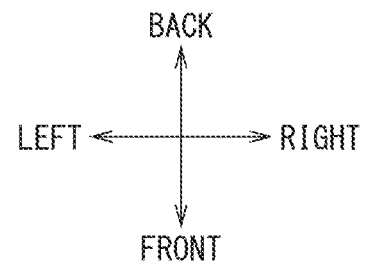

FIG. 6 is a plan view of the printed circuit board 30. In FIG. 6, to facilitate understanding of the constitution, the center and outside openings 31 and 35 are omitted. As shown in FIG. 6, in the present embodiment, on the printed circuit board 30, nine visible light emitting devices 32 are provided. The visible light emitting devices 32 are arranged at substantially equal intervals in the front-back direction and left-right direction. In particular, in the present embodiment, the visible light emitting devices 32 are arranged in three lines in the front-back direction and three lines in the left-right direction. The visible light emitting device 32 positioned at the center among these visible light emitting devices 32 is arranged at the substantial center of the printed circuit board 30. In other words, the visible light emitting device 32 positioned at the substantial center among the visible light emitting devices 32 is arranged so as to be positioned superposed over the center part of the cover member 10 when viewed from above.

Note that, in the present embodiment, visible light emitting devices 32 are used as the visible light emitters, but as long as able to emit visible light, electric light bulbs or other devices other than visible light emitting devices 32 may also be used as the visible light emitters.

Figure 10:
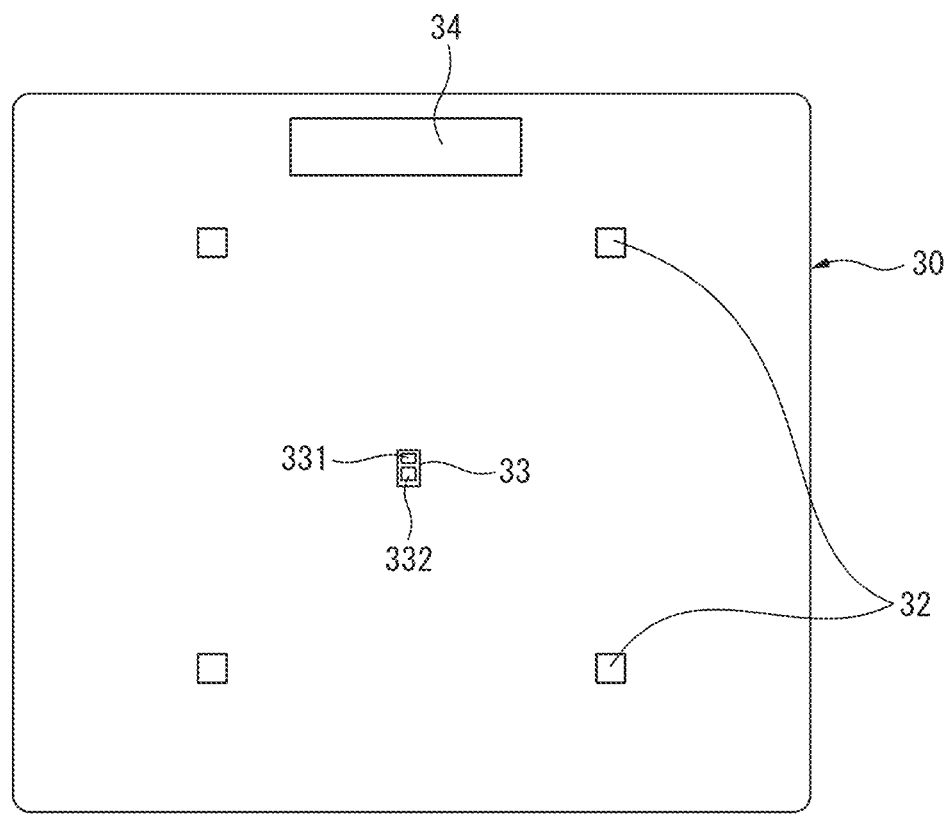
FIG. 10 is a plan view, similar to FIG. 6, of a printed circuit board according to one modification.
Figure 10:
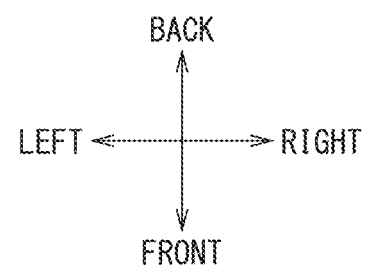

Further, in the present embodiment, the light emitting apparatus 1 is provided with nine visible light emitting devices 32. However, the light emitting apparatus 1 may also be provided with another number of (including one) visible light emitting devices 32. Even if the number of visible light emitting devices 32 is a number other than nine, for example, as shown in FIG. 10 in which the number of the visible light emitting devices 32 is four, the visible light emitting devices 32 are preferably arranged at equal intervals on the printed circuit board 30. Due to this, the visible light emitting devices 32 can be used to emit visible light by a relatively uniform strength at the inside surface of the cover member 10 as a whole. In particular, if the visible light emitting devices 32 are arranged in odd number lines in the front-back direction, part of the visible light emitting devices 32 are preferably arranged at the substantial center in the front-back direction. If the visible light emitting devices 32 are arranged in odd number lines in the left-right direction, part of the visible light emitting devices 32 are preferably arranged at the substantial center in the left-right direction. Further, both if only a single visible light emitting device 32 is provided or if a plurality are provided, in each case preferably one visible light emitting device 32 is provided at a position superposed over a center part of the cover member 10 when viewed from above. Due to this, the inside surface of the cover member 10 as a whole can be irradiated with visible light.

Infrared Sensor

The infrared sensor 33 is a sensor outputting a signal corresponding to the state of deformation of the cover member 10. In the present embodiment, the infrared sensor 33 outputs a signal corresponding to the strength of infrared light, which changes in accordance with the distance between the infrared sensor 33 and the inside surface of the cover member 10. As shown in FIG. 6, in the present embodiment, a single infrared sensor 33 is provided at the center part of the printed circuit board 30. In other words, the infrared sensor 33 is arranged so as to be positioned superposed over the center part of the cover member 10, when viewed from above. Further, the infrared sensor 33 is arranged at the front side (front surface side of light emitting apparatus 1) from the visible light emitting device 32 arranged at the center part of the printed circuit board 30. In the present embodiment, the infrared sensor 33 is configured as an integral sensor provided with an infrared light emitting device 331 and an infrared light receiving device 332. Further, in the present embodiment, the infrared sensor 33 is arranged so that the infrared light receiving device 332 is positioned at the front from the infrared light emitting device 331.

The infrared light emitting device 331 is one example of an invisible light emitter emitting invisible light, and emits infrared light. As the infrared light emitting device 331, for example, an infrared light LED, etc., is used. The infrared light emitting device 331 emits infrared light toward the inside surface of the cover member 10 by a broad directivity angle. In particular, in the present embodiment, the infrared light emitting device 331, as shown in FIGS. 2 and 3, emits infrared light so that the infrared light L emitted from the infrared light emitting device 331 strikes the center of the cover member 10. In other words, the infrared light emitting device 331 emits infrared light so as to make the infrared light strike as broad a range as possible of the inside surface of the cover member 10.

The infrared light receiving device 332 is one example of an invisible light receiver receiving invisible light and converting it to an electrical signal, and receives infrared light and outputs an electrical signal corresponding to its strength. As the infrared receiving device, for example, a photodiode, phototransistor, etc., is used. In the present embodiment, the infrared light receiving device 332 receives infrared light heading toward the infrared light receiving device over a relatively broad reception range (directivity angle of received light), and outputs an electrical signal corresponding to the strength of the received infrared light as a whole. Therefore, the infrared light receiving device 332 receives infrared light emitted from the infrared light emitting device 331 and reflected at the cover member, and outputs an electrical signal corresponding to the strength of the received infrared light.

Note that, in the present embodiment, as the invisible light emitter, the infrared light emitting device 331 is used, but as long as able to emit invisible light, a device other than the infrared light emitting device 331 may also be used as the invisible light emitter. Therefore, the invisible light emitter may, for example, be an LED emitting ultraviolet light, etc. Further, in the present embodiment, an infrared light receiving device 332 is used as the invisible light receiver, but as long as possible to receive invisible light emitted by the invisible light emitter, a device other than the infrared light receiving device 332 may also be used as the invisible light receiver. Therefore, when, for example, the invisible light emitter is an LED emitting ultraviolet light, etc., the invisible light receiver may also be a device receiving ultraviolet light emitted from the invisible light emitter.

Further, in the present embodiment, a single infrared sensor 33 is provided at the light emitting apparatus 1, but a plurality of infrared sensors 33 may also be provided. Further, in the present embodiment, an integral sensor provided with an infrared light emitting device 331 and infrared light receiving device 332 is used, but a separate infrared light emitting device 331 and infrared light receiving device 332 may also be used. In this case, the number of the infrared light emitting devices 331 and the number of the infrared light receiving devices 332 need not be the same. Therefore, for example, a plurality of infrared light emitting devices 331 may be provided at the light emitting apparatus 1 and only a single infrared light receiving device 332 provided. Whatever the case, the light emitting apparatus 1 has one or more invisible light emitters and one or more invisible light receivers. If the number of invisible light emitters is greater, the range of emission of invisible light to the inside surface of the cover member 10 is broader. Further, if the number of invisible light receivers is greater, the range of reception of invisible light from the inside surface of the cover member 10 is broader. As a result, it becomes easier to detect deformation of the cover member 10 over a broad range of the cover member 10. Note that, both when only a single invisible light emitter is provided and when a plurality are provided, preferably a single invisible light emitter is provided at a position superposed over a center part of the cover member 10 when viewed from above. Due to this, the invisible light emitter provided at a position superposed over the center part can be used to emit invisible light over the entire inside surface of the cover member 10. Similarly, both when only a single invisible light receiver is provided and when a plurality are provided, preferably a single invisible light receiver is provided at a position superposed over a center part of the cover member 10 when viewed from above. The invisible light receiver provided at a position superposed over the center part can be used to receive invisible light from the entire inside surface of the cover member 10. Further, when a plurality of invisible light emitters are provided, preferably the invisible light emitters are arranged at equal intervals with each other when viewed from above. Similarly, when a plurality of invisible light receivers are provided, preferably the invisible light receivers are arranged at equal intervals with each other when viewed from above.

Furthermore, in the present embodiment, as the infrared sensor 33, a sensor having an infrared light emitting device 331 emitting infrared light by a broad directivity angle and an infrared light receiving device 332 receiving infrared light by a broad directivity angle is used. However, for example, a sensor having an infrared light emitting device having a high directivity such as an optical position sensor (PSD) and an infrared light receiving device having a broad light receiving region may also be used. Further, as the infrared light receiving device, a CCD image sensor or CMOS image sensor may be used. In this case, the infrared light receiving device can detect the strength of the infrared light at different positions of the light receiving region received by an infrared light receiving device having a two-dimensional light receiving region, and accordingly can identify the region in which the cover member 10 deforms. In this way, if using an optical position sensor or image sensor, the infrared light receiving device can not only detect the strength of the overall infrared light received, but can also detect the position of detection of the infrared light, the direction of detection of the infrared light, etc. Further, in this case, the control circuit 34 controls the mode of emission of visible light from the visible light emitting device 32 and the operation of the speaker 50, in accordance with the position of detection of the infrared light, the direction of detection of the infrared light, etc. Therefore, the control circuit 34 can be said to control the mode of emission of visible light from the visible light emitting device 32 and the operation of the speaker 50, in accordance with the state of reception of invisible light at the invisible light receiving device (which changes according to deformation of the cover member 10). Further, by the mode of emission of visible light from the visible light emitting device 32 changing, the mode of diffused light appearing at the surface of the cover member 10 changes.

Control Circuit

The control circuit 34 is one example of a controller for controlling the mode of emission of visible light from the visible light emitting devices 32, the mode of emission of infrared light from the infrared sensor 33, and the operation of the speaker 50. The control circuit 34 is electrically connected to the visible light emitting devices 32, infrared sensor 33, and speaker 50. The control circuit 34 sends a drive signal to the visible light emitting devices 32, and controls the on/off states, emission intensities, emitted color, etc. of the visible light emitting devices 32. Further, the control circuit 34 controls the on/off state of the infrared light emitting device 331 of the infrared sensor 33, and receives, from the infrared light receiving device 332, an electric signal corresponding to the strength of infrared light which the infrared light receiving device 332 receives. In addition, the control circuit 34 sends an acoustic signal to the speaker 50 to control the sound which the speaker 50 generates. The specific control in the control circuit 34 will be explained later.

Reinforcing Member

As shown in FIG. 4, the reinforcing member 40 is a substantially rectangular flat plate shaped member. The reinforcing member 40 is fastened to the housing fastened member 25 across the printed circuit board 30, and is arranged so as to extend in parallel with and between the printed circuit board 30 and the cover member 10 except for the surroundings of the visible light emitting devices 32 and the infrared sensor 33 (that is, infrared light emitting device 331 and infrared light receiving device 332). The reinforcing member 40 is formed to be thicker than the heights of the visible light emitting devices 32, infrared light emitting device 331, and infrared light receiving device 332. Further, in the present embodiment, the reinforcing member 40 is formed by a harder material than the cover member 10, which does not deform much at all even if pressed by the hand of the user.

Figure 7:
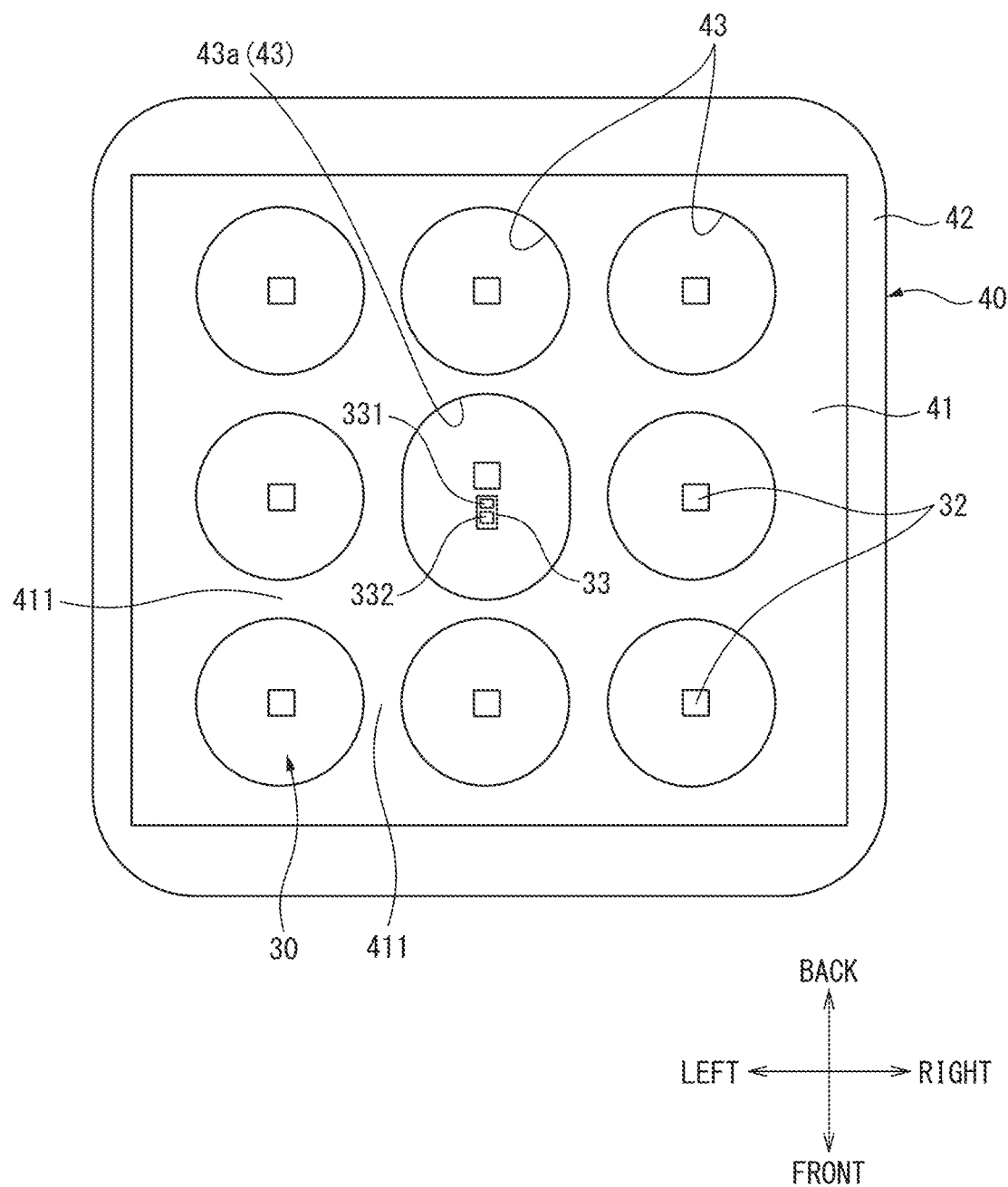
FIG. 7 is a plan view of a reinforcing member placed on a printed circuit board.

FIG. 7 is a plan view of the reinforcing member 40 arranged on the printed circuit board 30. As shown in FIGS. 3 and 7, the reinforcing member 40 is provided with a rectangular flat plate shaped base part 41, a flange part 42 provided around the outer circumference of the base part 41, openings 43 formed at the base part 41, and columnar parts 44 provided at the bottom surface of the base part 41.

The base part 41 is arranged so as to extend substantially in parallel with the printed circuit board 30, therefore, perpendicular to the axial direction passing through the center of symmetry of the cover member 10. The base part 41 is formed with a plurality of circular openings 43. The openings 43 are formed in the surroundings of all of the visible light emitting devices 32 and the infrared sensor 33 when viewed from above. Therefore, in the present embodiment, the base part 41 is formed with nine openings such as shown in FIG. 7. Further, each opening 43 is arranged so that the visible light emitting devices 32 or the infrared sensor 33 (that is, the infrared light emitting device 331 and infrared light receiving device 332) is positioned at the center thereof when viewed from above. In particular, in the present embodiment, the infrared sensor 33 and the visible light emitting device 32 at center are arranged aligned in the front-back direction, therefore an elliptically shaped opening 43*a* long in the front-back direction is formed around them.

As shown in FIG. 4, the flange part 42 is offset above from the outer circumference of the base part 41 at the reinforcing member 40, and extends in the circumferential direction (direction along top surface of base part 41). As will be understood from FIGS. 2 and 3, the flange part 42 is inserted into a recessed part provided near the opening edge of the cover member 10. Due to this, the cover member 10 is fastened to the reinforcing member 40. Therefore, in the present embodiment, the cover member 10 is not directly fastened to the housing 20, but is fastened through the reinforcing member 40.

As will be understood from FIGS. 2 to 4, the columnar parts 44 are used to cooperate with the columnar parts 26 of the housing fastened member 25 to fasten the printed circuit board 30 and reinforcing member 40 to the housing fastened member 25. Therefore, the columnar parts 44 of the reinforcing member 40 are provided at positions corresponding to the columnar parts 26 of the housing fastened member 25. In the present embodiment, the reinforcing member 40 is fastened to the housing fastened member 25 by the columnar parts 44 of the reinforcing member 40 receiving the front end parts of the columnar parts 26 of the housing fastened member 25 or the columnar parts 26 of the housing fastened member 25 receiving the front end parts 44 of the reinforcing member 40.

According to the reinforcing member 40 configured and arranged in this way, it is possible to keep the cover member 10 from reaching the printed circuit board 30 and thus the printed circuit board 30 from being damaged, when the cover member 10 is pressed by external force. On the other hand, openings 43 are provided around the visible light emitting devices 32 and the infrared sensor 33, therefore the reinforcing member 40 is not positioned in the range of emission of the visible light or infrared light, and accordingly interference between the visible light or infrared light and the reinforcing member 40 is prevented. In particular, in the present embodiment, circular openings 43 are provided around the visible light emitting devices 32 and the infrared sensor 33, therefore it is possible to prevent interference while enhancing the effect of suppression of damage to the printed circuit board 30. Further, by the circular openings 43 being provided around the visible light emitting devices 32, it is possible to keep visible light or infrared light from being emitted from the visible light emitting devices 32 or the infrared sensor 33 in unnecessary directions.

Speaker

The speaker 50 is one example of a sound generating device for generating a sound. The speaker 50 is configured so as to generate a sound in accordance with deformation of the cover member 10. The speaker 50 is arranged inside the housing 20 below the housing fastened member 25. The speaker 50 is connected to the control circuit 34 on the printed circuit board 30 through a conducting wire (not shown) and generates sound based on an acoustic signal sent from the control circuit 34.

Note that, in the present embodiment, a speaker 50 is used as a sound generating device, but as long as possible to generate a sound, a device other than the speaker 50 may be used as the sound generating device. Therefore, the sound generating device may, for example, be a bell, etc.

Operation

Next, operation of the light emitting apparatus 1 configured in this way will be explained. In the light emitting apparatus 1 of the present embodiment, when the cover member 10 is not pressed and is not deformed at all, visible light is not emitted to the cover member 10 and accordingly the cover member 10 does not appear to be shining. On the other hand, when cover member 10 is weakly pressed and deforms slightly, a small strength blue colored visible light is emitted to the cover member 10 and accordingly the cover member 10 appears to shine weakly blue in color. Furthermore, when the cover member 10 is strongly pressed and greatly deforms, a large strength red color visible light is emitted to the cover member 10 and accordingly the cover member 10 appears to shine strongly red in color. Furthermore, at this time, sound is generated. Below, operation of such a light emitting apparatus 1 will be explained in detail.

First, if the power of the light emitting apparatus 1 is turned on, the control circuit 34 starts the detection of the state of the deformation of the cover member 10 by the infrared sensor 33. Therefore, the control circuit 34 makes the infrared light emitting device 331 emit infrared light, and receives an electrical signal corresponding to the strength of the infrared light received by the infrared light receiving device 332 from the infrared light receiving device 332.

The infrared light emitted from the infrared light emitting device 331 toward the cover member 10 is partially diffused and reflected at the inside surface of the cover member 10. Part of the diffused and reflected infrared light strikes the infrared light receiving device 332. Here, when the cover member 10 is not deformed at all as shown in FIGS. 2 and 3, the inside surface of the cover member 10 is positioned relatively apart from the infrared sensor 33. For this reason, the infrared light emitted from the infrared light emitting device 331 is reflected and is broadly diffused when reaching the infrared light receiving device 332. Accordingly, the strength of the infrared light reaching the infrared light receiving device 332 is small. Therefore, when the cover member 10 is not deformed at all, the strength of the infrared light which the infrared light receiving device 332 receives is small. On the other hand, if the cover member 10 is pressed and deforms, the inside surface of the cover member 10 is positioned relatively close to the infrared sensor 33. For this reason, even when the infrared light emitted from the infrared light emitting device 331 is reflected and reaches the infrared light receiving device 332, it is not diffused that much. Accordingly, the strength of the infrared light reaching the infrared light receiving device 332 is large. Therefore, if the cover member 10 deforms, the strength of the infrared light which the infrared light receiving device 332 receives increases. The more the cover member 10 greatly deforms, the greater the strength of the infrared light received. Therefore, in the present embodiment, the operations of the visible light emitting device 32 and the speaker 50 are controlled in accordance with the strength of the infrared light received by the infrared light receiving device 332.

Figure 8:
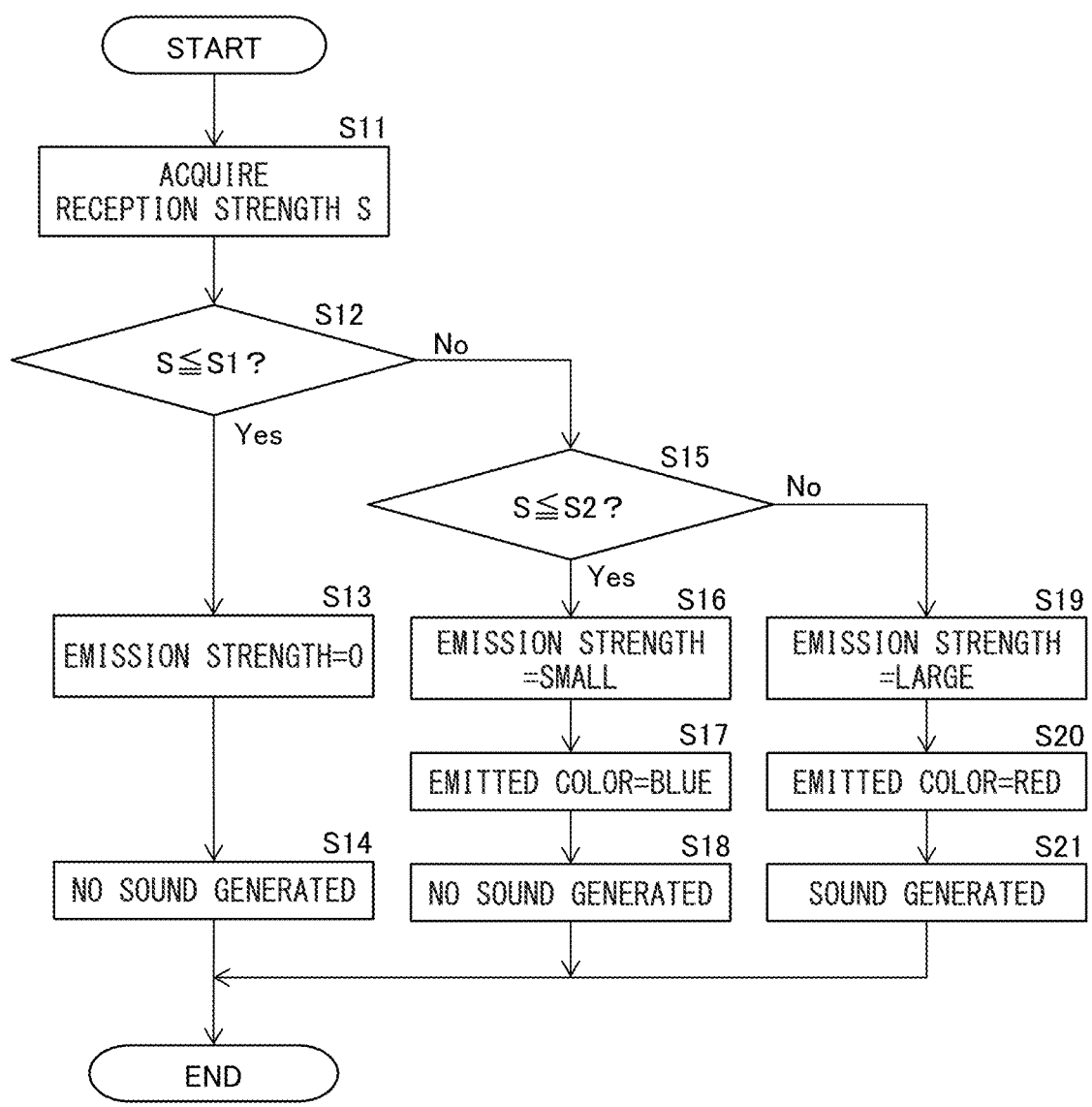
FIG. 8 is a flow chart showing a flow of control of a visible light emitting device and speaker by a control circuit.

FIG. 8 is a flow chart showing a flow of control of the visible light emitting devices 32 and the speaker 50, based on the reception strength of infrared light, by the control circuit 34. The illustrated control is performed at constant time intervals (for example, 0.1 second intervals).

As shown in FIG. 8, first, the control circuit 34 acquires the reception strength of the infrared light from the infrared light receiving device 332 (step S11). Next, the control circuit 34 judges if the acquired reception strength is less than or equal to a predetermined first reception strength S1 (step S12). The first reception strength S1 is a strength slightly higher than the strength of the infrared light which the infrared light receiving device 332 normally receives when the cover member 10 is not deformed at all.

If at step S12 it is judged that the acquired reception strength is less than or equal to the predetermined first reception strength S1, that is, if it is judged that the cover member 10 is not deformed at all, the control circuit 34 does not make the visible light emitting devices 32 emit visible light and accordingly the emission strength by the visible light emitting devices 32 becomes zero (step S13). In addition, in this case, the control circuit 34 does not make the speaker 50 generate sound (Step S14).

On the other hand, if at step S12 it is judged that the acquired reception strength is larger than the predetermined first reception strength S1, it is judged if the acquired reception strength is less than or equal to a second reception strength S2, which is higher than the first reception strength S1 (step S15). The second reception strength S2, for example, is the strength of the infrared light which the infrared light receiving device 332 receives when pressing the center of the cover member 10 in by about ¼ of the height of the cover member 10.

If at step S15 it is judged that the acquired reception strength is less than or equal to a preset second reception strength S2, that is, if it is judged that the cover member 10 has slightly deformed, the control circuit 34 makes the visible light emitting devices 32 emit visible light at a relatively small strength (step S16). Further, in this case, the control circuit 34 makes the visible light emitting devices 32 emit blue visible light (step S17). In addition, in this case as well, the control circuit 34 does not make the speaker 50 generate sound (step S18).

If at step S15 it is judged that the acquired reception strength is larger than the preset second reception strength S2, that is, if it is judged that the cover member 10 has greatly deformed, the control circuit 34 makes the visible light emitting devices 32 emit visible light at a relatively large strength (step S19). Further, in this case, the control circuit 34 makes the visible light emitting devices 32 emit red visible light (step S20). In addition, in this case, the control circuit 34 makes the speaker 50 generate music or other sound.

Advantageous Effects

In the above embodiments, if the cover member 10 is deformed by external force, the mode of emission of visible light emitted at the cover member 10 is changed. As a result, the mode of the diffused light appearing at the cover member 10 changes. Therefore, according to the above embodiments, it is possible to change the visual perception of the light of the cover member in accordance with deformation of the cover member by external force, whereby pleasing to a user.

Further, in the above embodiments, the visible light emitting devices 32 are arranged at equal intervals with each other. In addition, the top part 11 of the cover member 10 is arranged substantially parallel with the printed circuit board 30. Therefore, the distances between the visible light emitting devices 32 and the inside surface of the cover member 10 is substantially constant. Furthermore, the cover member 10 has uniform thickness over its entirety. For this reason, according to the above embodiments, if emitting visible light by the visible light emitting devices 32 in the state of no deformation by external force, a uniform strength of visible light is emitted at the cover member 10. As a result, in a region with no deformation by external force, it is possible to make transmitted and diffused light of a uniform strength appear at the outside surface of the cover member 10. Further, if the cover member 10 deforms due to external force, a portion of the cover member 10 deformed and pressed in approaches the visible light emitting devices 32, therefore it is possible to make that portion appear brighter than the other portions whereby pleasing to a user.

Further, in general, a user will often press the cover member 10 from the front surface side. Accordingly the front surface side of the cover member 10 will often be pressed. In the above embodiments, the infrared sensor 33 provided at the center part of the printed circuit board 30 is arranged at the front side from the visible light emitting device 32 provided at the center part of the printed circuit board 30. Therefore, according to the present embodiment, the sensitivity to deformation of the cover member 10 at the front surface side with a high frequency of being pressed by the user is increased.

Further, in the above embodiments, the cover member 10 is arranged to form the top surface of the light emitting apparatus 1. As a result, the user can press the cover member 10 from above and can easily operate the cover member 10.

Modifications

Above, preferred embodiments according to the present disclosure were explained, but the present disclosure is not limited to these embodiments and can be revised and changed in various ways within the scope of the claims. Below, modifications of the above embodiments will be explained.

For example, the light emitting apparatus 1 need not be provided with the reinforcing member 40 and the speaker 50.

Further, in the above embodiments, the cover member 10 is formed to have a uniform thickness, but it may also be formed to have thicknesses differing for different regions. For example, if forming the cover member 10 into a semispherical shape, the cover member 10 may, for example, be formed to be gradually thicker from the center toward the outer circumference. Due to this, the cover member 10 is formed thick in a region close in distance from the visible light emitting devices 32 and the cover member 10 is formed thin in a region far in distance from the visible light emitting devices 32, and therefore the cover member 10 as a whole appears to uniformly shine when making the visible light emitting devices 32 emit light.

Further, in the above embodiments, the control circuit 34 changes the strength and color of the visible light emitted from the visible light emitting device 32 in three stages, in accordance with the strength of the infrared light which the infrared light receiving device 332 receives. However, in addition to or instead of the strength and color of the visible light, the control circuit 34 may change the pattern of emission of visible light from the visible light emitting devices 32 (on/off states or timing, etc., at the plurality of visible light emitting devices 32) in accordance with the strength of infrared light which the infrared light receiving device 332 receives. Further, the control circuit 34 may also change the strength, color, and emission pattern of the visible light emitted from the visible light emitting devices 32 in two stages or four or more stages, or change the strength and color of the visible light continuously. Further, in the above embodiments, if the cover member 10 is not deformed, the control circuit 34 is made to not make the visible light emitting devices 32 emit visible light, but even in such a case, the control circuit 34 may make the visible light emitting devices 32 emit visible light (in this case, preferably relatively low strength visible light).

Further, in the above embodiments, the control circuit 34 changes whether or not to generate sound from the speaker 50, in accordance with the strength of the infrared light which the infrared light receiving device 332 receives. However, the control circuit 34 need not change whether or not to generate sound, in accordance with the strength of infrared light (the light emitting apparatus 1 need not have the speaker 50), or may change not only whether to generate sound from the speaker 50, but also the magnitude and type of the same in accordance with the strength of the infrared light.

In addition, in the above embodiments, the control circuit 34 controls the mode of emission of visible light from the visible light emitting devices 32 and the operation of the speaker 50, in accordance with the strength of the infrared light which the infrared light receiving device 332 receives. Here, the cover member 10 partially transmits infrared light, therefore infrared light at the outside of the light emitting apparatus 1 passes through the cover member 10 and strikes the infrared light receiving device 332. Therefore, there is a possibility of the strength of the infrared light, which the infrared light receiving device 332 receives, changing in accordance with the environment at the outside of the light emitting apparatus 1.

Therefore, the control circuit 34 may control the mode of emission of visible light from the visible light emitting devices 32 or the operation of the speaker 50, based on the difference between the strength of infrared light which the infrared light receiving device 332 receives when the infrared light emitting device 331 does not emit infrared light and the strength of infrared light which the infrared light receiving device 332 receives when the infrared light emitting device 331 emits infrared light.

Figure 11:
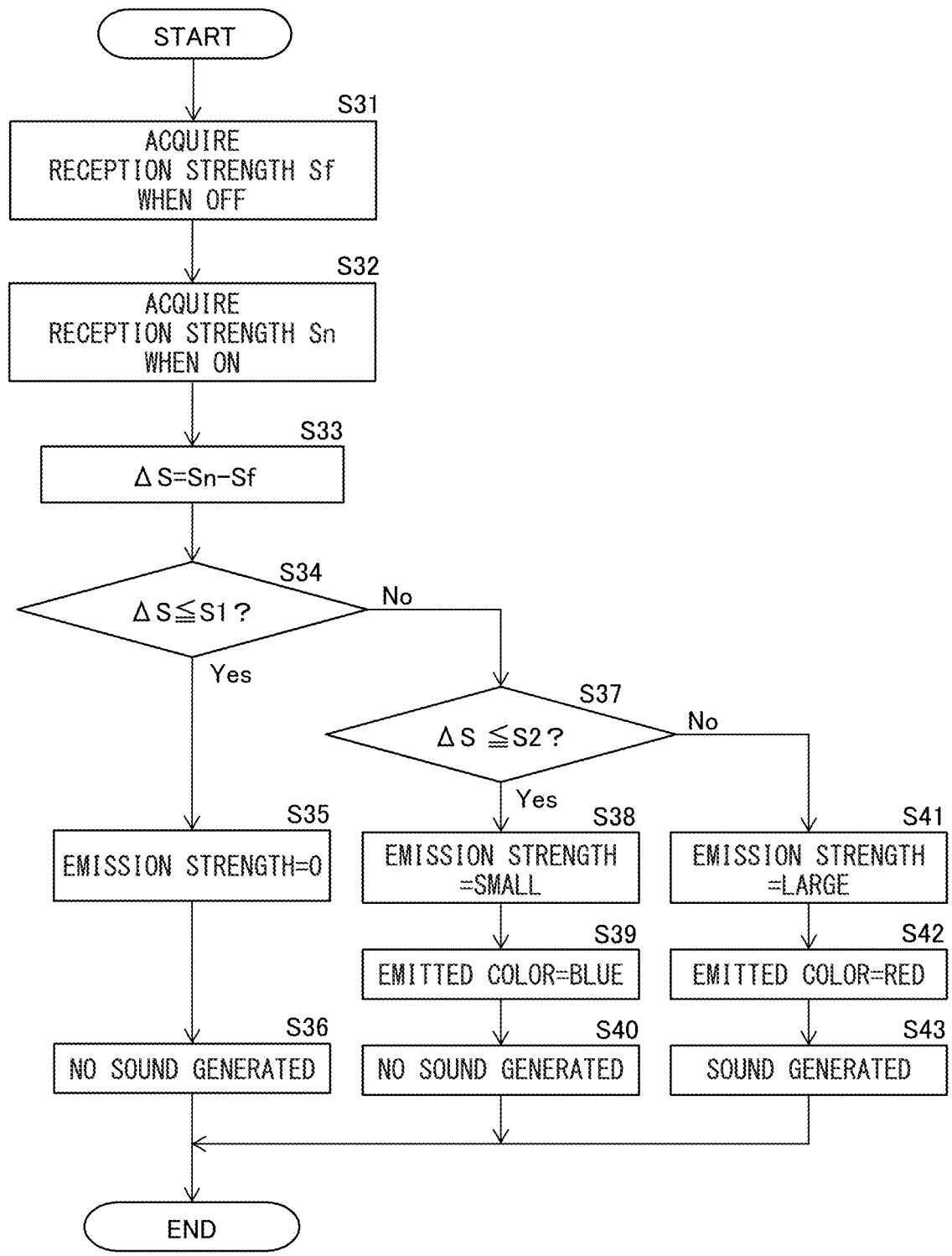
FIG. 11 is a flow chart, similar to FIG. 8, showing a flow of control of a visible light emitting device and speaker by a control circuit.

FIG. 11 is a flow chart, similar to FIG. 8, showing the flow of control of the visible light emitting devices 32 and the speaker 50 by the control circuit 34 in the present modification. In the present modification, the control circuit 34 intermittently makes the infrared light emitting device 331 emit infrared light.

As shown in FIG. 11, first, the control circuit 34 acquires the strength Sf of infrared light which the infrared light receiving device 332 receives when infrared light is not being emitted from the infrared light emitting device 331, as the reception strength when the infrared light emitting device 331 is off (step S31). Next, the control circuit 34 acquires the strength Sn of infrared light which the infrared light receiving device 332 receives when infrared light is being emitted from the infrared light emitting device 331, as the reception strength when the infrared light emitting device 331 is on (step S32). Next, the control circuit 34 calculates the difference of strength ΔS by subtracting the reception strength Sf when the infrared light emitting device 331 is off from the reception strength Sn when the infrared light emitting device 331 is on calculated in the above way (step S33). After that, at steps S34 to S43, the control circuit 34 performs an operation similar to steps S12 to S21 of FIG. 8, except for using the difference of strength ΔS instead of the reception strength S.

Further, in the above embodiments, in the light emitting apparatus 1, if the cover member 10 deforms, the mode of the diffused light appearing on the outside surface of the cover member 10 changes in accordance with the deformation, but in addition to or in place of this, the mode of display in the above-mentioned display device (liquid crystal display, etc.) may change in accordance with deformation of the cover member 10.

The invention claimed is:

1. A light emitting apparatus, comprising:
a visible light emitter for emitting visible light;
an invisible light emitter for emitting invisible light;
an invisible light receiver for receiving invisible light emitted from the invisible light emitter;
a cover member arranged spaced apart from the visible light emitter, the invisible light emitter, and the invisible light receiver and covering the visible light emitter, the invisible light emitter, and the invisible light receiver; and
a controller for controlling operation of the visible light emitter, wherein
the cover member has flexibility so as to deform when receiving external force, and at least partially reflects invisible light emitted from the invisible light emitter and passes and diffuses visible light emitted from the visible light emitter,
the invisible light emitter emits invisible light toward an inside surface of the cover member, and the invisible light receiver receives invisible light emitted from the invisible light emitter and reflected by the cover member,
the controller controls a mode of emission of visible light emitted from the visible light emitter in accordance with a state of reception of invisible light at the invisible light receiver, which changes in accordance with deformation of the cover member.

2. The light emitting apparatus according to claim 1, wherein the controller changes at least one of a strength, color, and emission pattern of visible light emitted from the visible light emitter, in accordance with the state of reception of invisible light at the invisible light receiver.

3. The light emitting apparatus according to claim 1, wherein
one or more invisible light receivers are provided at the light emitting apparatus, and
one of the invisible light receivers is positioned so as to be superposed over a center part of the cover member when viewed in an axial direction passing through a center of symmetry of the cover member.

4. The light emitting apparatus according to claim 1, wherein
one or more visible light emitters are provided at the light emitting apparatus, and
one of the visible light emitters is positioned so as to be superposed over a center part of the cover member when viewed in an axial direction passing through a center of symmetry of the cover member.

5. The light emitting apparatus according to claim 3, wherein
one or more visible light emitters are provided at the light emitting apparatus,
one of the visible light emitters is positioned so as to be superposed over a center part of the cover member when viewed in the axial direction, and
the invisible light receiver positioned so as to be superposed over the center part when viewed in the axial direction is arranged more at a front surface side of the light emitting apparatus than the visible light emitter positioned so as to be superposed over the center part when viewed in the axial direction.

6. The light emitting apparatus according to claim 1, wherein
a plurality of the visible light emitters are provided at the light emitting apparatus, and
the visible light emitters are arranged at equal intervals with each other when viewed in an axial direction passing through a center of symmetry of the cover member.

7. The light emitting apparatus according to claim 1, wherein a plurality of the visible light emitters are provided at the light emitting apparatus, and the visible light emitters are arranged on the same flat surface and the cover member has a part extending substantially parallel to the flat surface.

8. The light emitting apparatus according to claim 1, further comprising:

a circuit board extending perpendicular to an axial direction passing through a center of symmetry of the cover member, wherein the visible light emitter, the invisible light emitter, and the invisible light receiver are arranged on the same surface of the circuit board.

9. The light emitting apparatus according to claim 1, further comprising:

a circuit board on which the visible light emitter, the invisible light emitter, and the invisible light receiver are mounted, and a reinforcing member extending in parallel with and between the circuit board and the cover member other than at the surroundings of each visible light emitter, invisible light emitter, and invisible light receiver.

10. The light emitting apparatus according to claim 9, wherein the reinforcing member has circular openings centered about each visible light emitter, invisible light emitter, and invisible light receiver when viewed in an axial direction passing through a center of symmetry of the cover member.

11. The light emitting apparatus according to claim 1, further comprising:

a sound generating device for generating a sound, wherein the controller controls operation of the sound generating device in accordance with a state of reception of invisible light at the invisible light receiver.

12. The light emitting apparatus according to claim 1, wherein at least part of the cover member is made of semitransparent silicone.

13. The light emitting apparatus according to claim 1, wherein the controller controls operation of each visible light emitter based on a difference between a state of reception by the invisible light receiver when the invisible light emitter does not emit invisible light and a state of reception by the invisible light receiver when the invisible light emitter emits invisible light.

14. The light emitting apparatus according to claim 1, wherein the controller controls a mode of emission of visible light from the visible light emitter in accordance with a reception strength of invisible light at each invisible light receiver.

15. The light emitting apparatus according to claim 1, wherein the cover member is arranged so as to form an upper surface of the light emitting apparatus.

* * * * *